Charles F. Wallace
and John R. MacKay
INVENTORS

BY Cooper, Kerr & Dunham
ATTORNEYS

Patented Nov. 28, 1939

2,181,841

UNITED STATES PATENT OFFICE 2,181,841

MOTOR AND MOTOR-OPERATED APPARATUS

Charles F. Wallace, Westfield, and John R. MacKay, West Caldwell, N. J., assignors to Wallace & Tiernan Products, Inc., Belleville, N. J., a corporation of New Jersey Application May 18, 1936, Serial No. 80,264

14 Claims. (Cl. 172—36)

This invention relates to apparatus of the kind patented in Letters Patent of the United States No. 1,985,357 and has for certain of its objects to provide improvements in such apparatus and to provide novel combinations involving the use of such apparatus.

One of the objects of the invention is to provide a comparatively low reluctance return path for the magnetic flux which passes from one end of the rotor to the other, whereby greater efficiency is attained and more satisfactory construction is facilitated.

Other objects are to provide novel electrical contact or switching means, and novel circuit connections, whereby accurate adjustment is facilitated, improvements in efficiency effected, and the range of utility of the apparatus extended.

Other objects and advantages will appear as the invention is hereinafter disclosed.

Referring to the drawings, which illustrate what we now consider to be advantageous physical embodiments of the invention.

Figure 7:
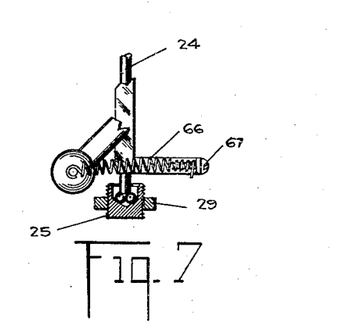
Fig. 7 is a detail elevation, partly in section, showing the lower end of the rotor shaft and a bearing therefor, and some of the parts carried by the shaft.

The motor comprises a stationary electromagnetic field or stator and a rotor. The field comprises the two coils or electromagnets 20, 21 each of which consists of a coil of wire, of suitable size and number of turns dependent on the supply voltage to be employed and the power required, wound on a frame or spool 22 of appropriate insulating material, such as Bakelite. The rotor 23 is permanently magnetized, or poled, is advantageously constructed of metal in the nature of cobalt steel, and is secured to a shaft 24 journaled at its extremities in thrust bearings 25, 25. The rotor 23 is secured to the shaft 24 by means of a bushing 26. If desired, the rotor may be adjustably secured to the shaft by means of a collar and set screws as shown at 15, 16 in the above cited Letters Patent No. 1,985,357. The bearings 25, 25 are each so constructed as to constitute a thrust bearing and they are appropriately axially adjustable. Thus each bearing 25 comprises a plurality of balls, in the present case three, between which a conical end of the shaft 24 seats (see Fig. 7). Each bearing 25 is externally screw-threaded so as to be capable of being advanced into or withdrawn out of the corresponding stationary plate 27, 28, lock nuts 29, 29 being provided to secure the bearings in the desired relative position of axial adjustment. By virtue of these various provisions the rotor 23 may be accurately positioned with respect to the field or stator, both axially and angularly, and will rotate freely with comparatively little friction at the bearings, yet without undesired radial or end play of the rotor shaft.

The field coils 20, 21 are automatically intermittently energized so as to produce rotation of the rotor 23. While the instrumentalities shown in the cited Patent No. 1,985,357 may be advantageously employed in certain cases for effecting and controlling such energization of the field coils, those which we shall presently proceed to describe will be found preferable in many other cases. Before proceeding with that description, we shall first describe another feature of my present invention that is also of considerable importance.

When a single rotor 23 is employed, as was the case in the particular motor illustrated in the said Patent No. 1,985,357, precautions must be taken to avoid losses such as those produced by eddy currents. This formerly required the use of nonmetallic materials adjacent the rotor so as to avoid undesired loss of efficiency, although metal was otherwise preferable from the standpoint of construction, cost, and durability. Even when such precautions in design and construction were taken, still there were losses in efficiency due to the proximity of metal parts outside the motor casing.

Figures 13, 14, 15, 16, 17, 18:
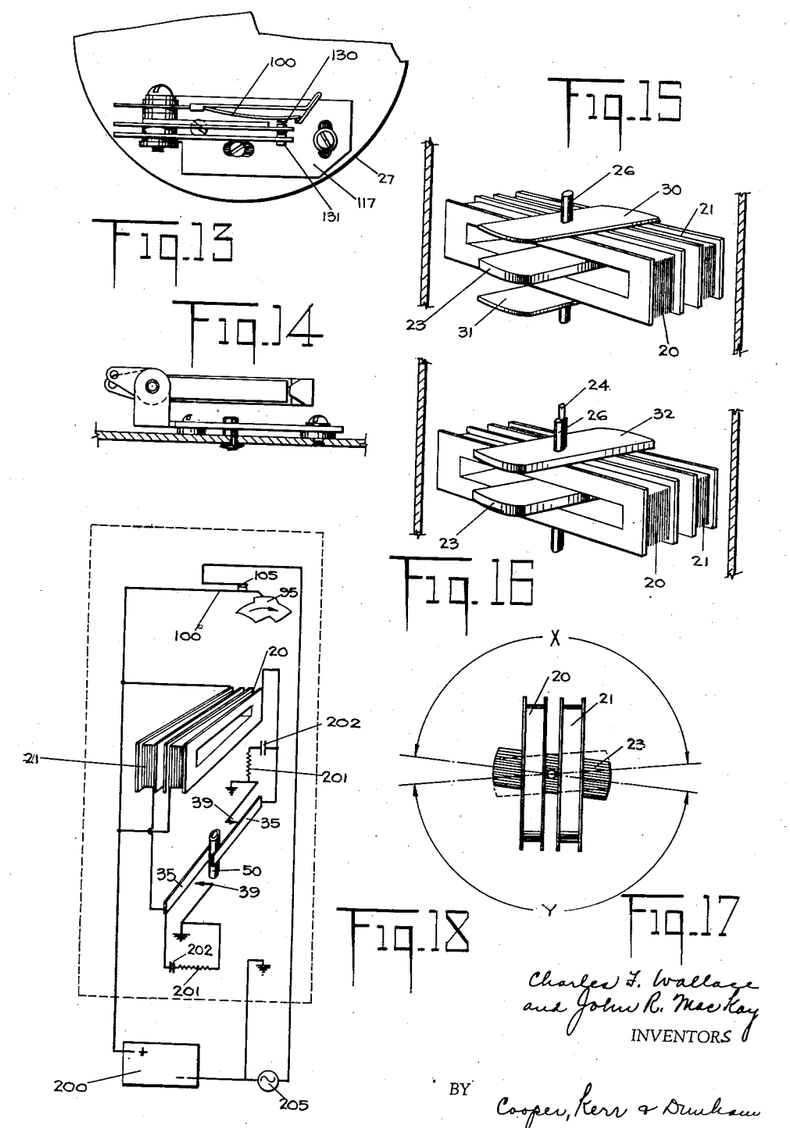
Figs. 13 and 14 are views similar to Figs. 10 and 12 but illustrating a modification.
Figs. 15 and 16 are detail perspective views illustrating different forms of means providing a comparatively low reluctance return path.
Fig. 17 is a diagrammatic plan view.
Figs. 18–21 are wiring diagrams.

We now have provided means for localizing the magnetic flux emanating from one end of the rotor 23 and returning to the other end thereof. One form of such means is shown in Fig. 15 and comprises strips or bars 30, 31 of magnetizable material, such as good grade Swedish iron, secured to the bushing 26 to which the rotor 23 is also secured, and in axial and radial alignment with the rotor 23. The strips or bars 30, 31 mounted outside the coils 20, 21 but in proximity to the rotor 23 provide two paths of high permeability (low reluctance) for the magnetic flux emanating from one end of the permanently magnetized rotor 23 and returning to the other end thereof. The magnetic field is thus localized and the casing or housing of the motor, and other adjacent parts, may be made of suitable metal without serious loss of efficiency due to eddy currents. In addition to minimizing eddy current losses, the provision of the bars 30, 31 also provides a more efficiently operating motor. Also, to a certain extent, the bars 30, 31 serve as "keepers" and the magnetism of the rotor 23 is the more permanently maintained. Furthermore, the bars 30, 31 constitute in effect supplemental rotors. The bars 30, 31 provide an increased flywheel effect. In certain cases it may be unnecessary or undesirable to use both bars 30, 31, and one of them may be omitted.

Figures 1, 2, 3, 4, 5:
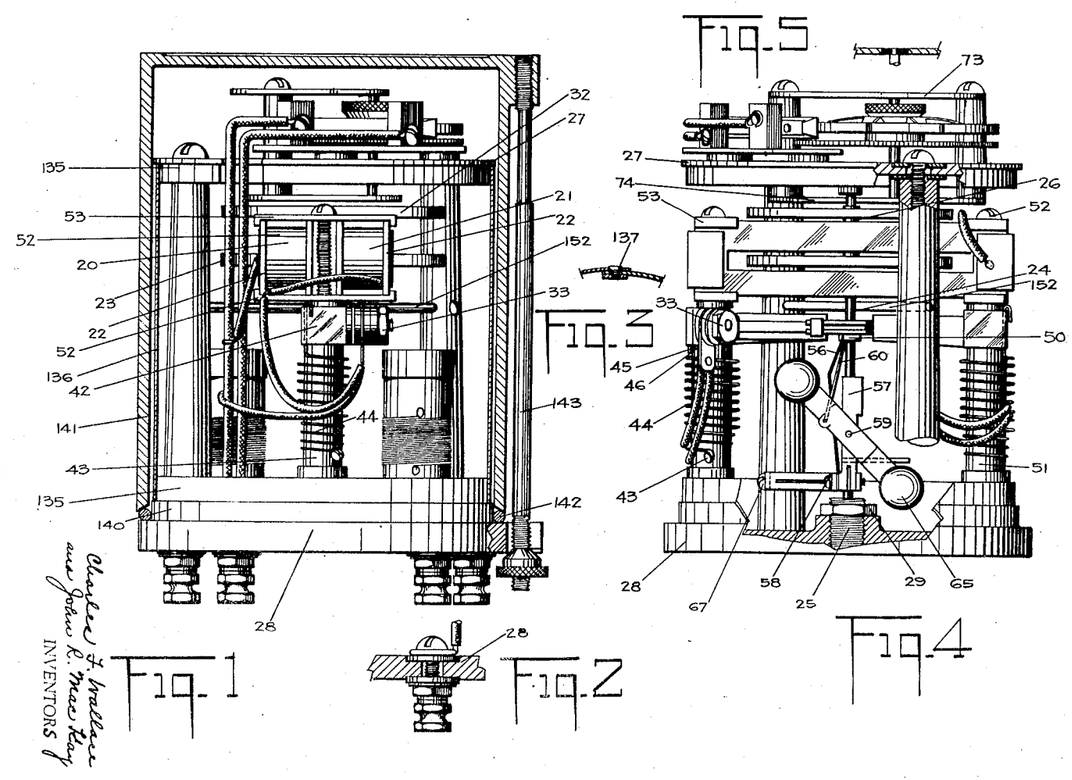
Fig. 1 is an elevation, with the casings or housings in section, of one type of improved motor.
Fig. 2 is a fragmentary detail elevation, partly in section, of a part of an end plate and one of the binding posts mounted therein.
Fig. 3 is a fragmentary detail horizontal section through the wall of the inner casing.
Fig. 4 is a side elevation, with certain parts removed and others shown broken away, of the apparatus shown in Fig. 1.
Fig. 5 is a detail sectional elevation showing one of the bearings of the program mechanism.

Another and quite satisfactory and practical way of overcoming the objections and disadvantages, incident to the use of a single rotor 23, is shown in Figs. 1, 4 and 16. A permanent magnet 32, which may be in all respects like the permanent magnet (rotor) 23, is secured to the bushing 26 so as to be in axial and radial alignment with the rotor 23. The S pole of the magnet 32 lies adjacent the N pole of the rotor and the N pole of the magnet 32 lies adjacent the S pole of the rotor; the poles being at the ends of the magnet 32 and the rotor 23. The permanent magnets 23, 32, located one within and one outside the coils 20, 21, constitute an astatically balanced system. As above explained, superior construction, greater economy and increased efficiency result.

Two sets of motor contacts are provided. A description of one set will suffice since the other is a duplicate set (see particularly Fig. 9).

The contact set, designated generally as 33, comprises a spring strip 35 carried at one end by a stud 36, but suitably insulated therefrom, and provided at its free end with a wear-resistant metallic shoe 37 for engaging a rotatable sleeve 50 hereinafter described. The spring strip 35 is provided also with a contact 38, preferably constructed of one of the rare metals commonly employed for electrical contacts. By virtue of the inherent resiliency of the strip 35, the contact 38 is biased toward and adapted to engage a similar contact 39 secured to a metallic strip 47 carried by, but insulated from, the stud 36; the strip 47 being backed up or reinforced by a comparatively heavy metallic strip 40 provided with an adjusting screw 41. The strip 40 is also carried by, but insulated from, the stud 36. By turning the screw 41, in one direction or the other, the gap or distance between the contacts 38, 39 may be adjusted as desired. The stud 36 is secured to a pivot block 42 adapted to oscillate about the standard or post 43 upon which it is mounted. A helical spring 44 surrounding the post 43 has one of its ends secured to the post and its other end secured to the pivot block 42 whereby the contact assembly is biased or urged by the spring 44 in a counter-clockwise direction (Fig. 9); the extent of such movement being limited by the engagement of a stop pin 45, secured to the pivot block 42, with a stop pin 46, secured to the post 43.

Figure 9:
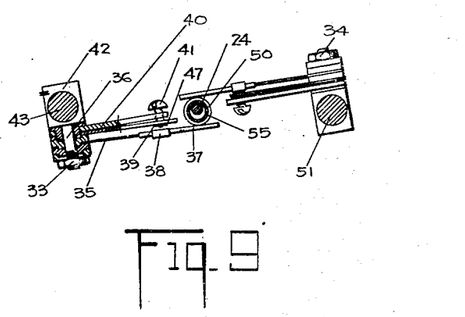
Fig. 9 is a detail horizontal sectional view showing an improved contact mechanism.

This latterly described construction permits the contact assembly to be readily manually swung outwardly clear of the motor assembly thereby facilitating inspection, adjustment, and cleaning of the contacts, and, after any of such necessary or desirable operations has been performed, the spring 44 automatically returns the contact set to its operative position as determined by the engagement of the stop pins 45, 46.

As stated, the other contact set, designated generally as 34, is similar to the contact set 33 and therefore need not be described in detail. Suffice it to say that the contact set 34 may be likewise swung about its supporting post 51 and will be automatically restored to its normal or operative position.

The contact sets 33, 34 are electrically connected to control energization and deenergization of the field of the motor as hereinafter described.

The posts 43, 51 are secured to the base 28 and serve not only to support the contact sets 33, 34, but also to support the coils 20, 21 by means of suitable clamping screws 52 and brackets 53 engageable with the spools upon which the coils are wound. Preferably, the base 28 and the posts 43 and 51 are made of metal in one piece, as by die casting.

The wear-resisting metallic shoes 37, 37 of the contact sets 33, 34 are engaged and mechanically operated by the sleeve 50 which is constructed of suitable wear-resisting material such as ebonite or Celluloid. Alternately, the shoes 37, 37 may be made of suitable wear-resistant insulating material and the sleeve 50 made of wear-resistant metal. The sleeve 50 is mounted on a metal bushing 55 secured to a spring leaf 56, in turn secured to a plate 57 by screws 58. The plate 57 is clamped to the rotor shaft 24 to rotate therewith. A governor 65 is pivotally mounted at 59 on the plate 57 and has pivotally secured thereto a bail 60 which extends, at its upper end, between the shaft 24 and the leaf spring 56. Depending upon the angular position of the governor with respect to the axis of the shaft 24, in turn depending on the angular velocity of the shaft, the sleeve 50 will be either coaxial or more or less eccentric with respect to the shaft. The governor 65 is biased, in a direction opposite to the centrifugal force acting upon it, by a helical spring 66 secured at one end to the governor and at its opposite end to an adjusting screw 67 screw-threadedly mounted in a bracket or extension on the plate 57.

In view of the foregoing description, and that contained in the cited Patent No. 1,985,357, it will be understood that the governor controls the position of the sleeve 50 with respect to the axis of the shaft 24, i. e., whether the sleeve 50 shall be concentric or eccentric, and the degree of eccentricity, dependent upon the angular velocity of the shaft 24. When operating, the governor swings out tending to position the sleeve 50 concentrically with the shaft 24 and opening the contacts 38—39. As the speed drops down, the governor weights swing in and place the sleeve 50 in an eccentric position with respect to the shaft 24, permitting each set of contacts 38—39 to close once during each revolution thereby giving the rotor or rotors momentary impulses until the predetermined speed is attained. The torque exerted upon the rotor or rotors depends upon the angular or segmental length, so to speak, of the time of closure of the contacts 38—39. It is by controlling this length of time that the automatic speed control is effected. The motor will maintain its predetermined speed automatically, once it has been adjusted, even though different loads may be placed upon the motor. If the load is comparatively light, the duration of contact at 38—39 during each revolution will be relatively short; if the load is comparatively heavy the duration of contact will be relatively long, but in any case the speed of the motor will be automatically maintained substantially constant. The predetermined constant speed desired may be varied by turning the screw 67 in one direction or the other to increase or decrease the tension of the governor-biasing spring 66. After such adjustment is effected to select the desired predetermined speed the motor will automatically run at that selected speed and there will be no substantial departure therefrom.

As disclosed in the cited Patent No. 1,985,357, so also the motor herein disclosed may be used to operate a code wheel which in turn operates electrical contacts for flashing a light in a warning beacon as used in marine or highway work.

The rotor shaft 24 has secured thereto a pinion 70 which meshes with a gear wheel 71 mounted on a shaft 72 journaled at its opposite ends in plates 73, 74 secured to and carried by the plate 27 in spaced relation with respect thereto. The shaft 72 has secured thereto also a pinion 76 which meshes with a gear 77 secured to a shaft 78 journaled at its opposite ends in the plates 73, 74. The gear 77 is provided with a hub upon which a nut 90 screws so as to support a spring spider 91 in a position resiliently to engage a code wheel 95 of material in the nature of fibre or the like and cause the code wheel frictionally to engage the upper face of the gear wheel 77.

The code wheel 95 engages and operates, according to a predetermined code, a resilient contact 100 mounted on a stud 101 secured to but insulated from, the plate 117; the resilient contact 100, when engaged by the high spots of the code wheel 95, engaging a stationary contact 105 carried by a stud 106 secured to the plate 117, but insulated therefrom. The frictional contact between the code wheel or program disc 95 and the gear 77 is sufficient to cause the gear 77 to drive the program disc to operate the contacts 100—105 when the gear is rotating in the proper (i. e., counterclockwise) direction, but if and when the gear 77 is rotated in the wrong direction (i. e., clockwise), the program disc does not rotate, but slips, so that damage to the contact 100 is prevented.

We provide a novel means for adjusting the position of the plate 117, and the contact assembly which it supports, toward and away from the code wheel 95, whereby a vernier or very fine adjustment of the contact period of contacts 100—105 may be attained. Attention is now called to Figs. 6, 10, 11 and 12.

The contact-supporting plate 117 is pivotally connected to the plate 27 by a screw 155. An eccentric stud or cam 120 is rotatably mounted in the plate 27 (see Fig. 11) and projects through a slot 121 provided in the late 117; a spring washer 122 between the plate 27 and the lower upset end of the shaft of the cam 120 serves to hold the cam in place under proper tension or friction. By turning the cam or eccentric 120, as by means of a screw driver inserted in the slot provided in the top thereof, the plate 117 and contacts carried thereby may be moved by very fine adjustment toward or away from the code wheel, about the pivot 155. In this manner, the time of closure of the contacts 100—105 may be adjusted by what, in effect, constitutes a vernier adjustment. The plate 117 and its supported contacts may be clamped or held in any of the desired positions of adjustment by a clamping screw 125 which extends through a transverse slot 126 in the plate 117 and screws into the plate 27.

Figure 6:
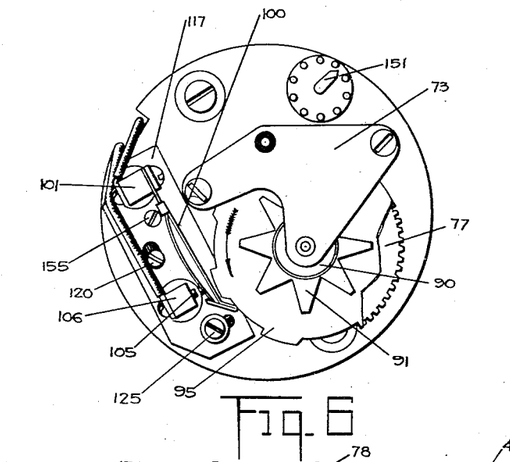
Fig. 6 is a top plan view of the apparatus shown in Fig. 3.
Figure 10:
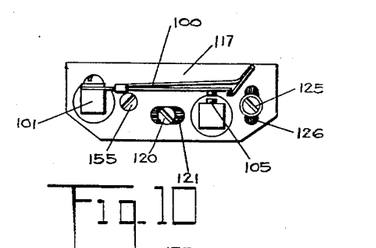
Fig. 10 is a detail top plan view of the circuit interrupting means also shown in Fig. 6.
Figure 11:
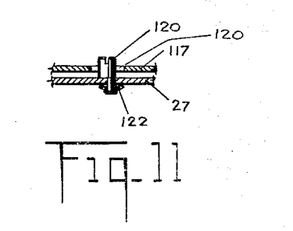
Fig. 11 is a detail sectional elevation of certain of the parts shown in Fig. 10.
Figure 12:
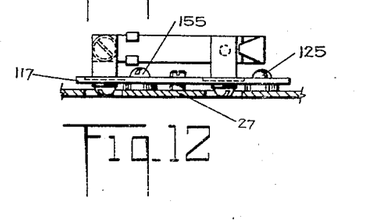
Fig. 12 is an elevation, partly in section, of the parts shown in Fig. 10.

Instead of providing merely one set of contacts 100—105, as in Figs. 6, 10 and 12, multiple contacts 100—130—131 may be provided, as shown in Figs. 13 and 14. In this instance, the contacts 100, 130, 131, are each mounted on a corresponding one of three spring strips, all secured to but insulated from a single post or bracket on the plate 117; the contacts 100, 130, 131 and their spring supports being suitably insulated from each other.

Each of the plates 27, 28 is shown provided with a rim or flange 135 around which a sheet 136 of Celluloid or equivalent transparent material is wrapped to form a transparent protective cylindrical casing for the comparatively delicate mechanism mounted therein. The overlapping edges of the sheet 136 are detachably connected as by screws 137, one of which is shown in Fig. 3. The base plate 28 is shown provided with an additional flange 140 adapted to extend into the open end of the cup-shaped casing 141 which encloses the entire motor and flasher assembly. A gasket or washer 142 may be provided between the lower edge of the casing 141 and the shoulder provided on the base 28 so as to effect a tight seal when the peripherally spaced bolts 143, of which one is shown in Fig. 1, are tightened.

Figure 8:
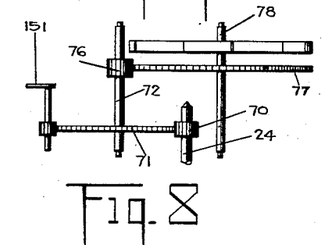
Fig. 8 is a somewhat diagrammatic detail elevation of a gear train which may be employed.

The motor is provided with a timing indicator 151 (Fig. 6) similar to that shown at 110 in the cited Patent No. 1,985,357, similarly driven (see Fig. 8) for a similar purpose, i. e., for timing the closure of the switch 100—105.

The motor is also provided with a stationary permanent magnet 152 similar to that shown at 33 in the cited Patent No. 1,985,357, similarly mounted, and for a similar purpose, i. e., to insure that the rotor (or rotors) will be brought to rest in a position in which the field will be energized when it is again desired to start the motor.

Suitable terminals or binding posts are mounted in the plate 28, but insulated therefrom and from each other (see Figs. 1 and 2), so as to facilitate electrical connections such as will now be described.

While, as stated, the field coils 20, 21 may be connected to one set of contacts such as 33 (Fig. 9) as shown in the cited Patent No. 1,985,357, and the other set of contacts omitted or not utilized; or while two sets of contacts may be employed, connected as described in lines 18 to 35 of page 4 of the specification of the cited Patent No. 1,985,357; one or another of the hook-ups which we shall now proceed to describe will be found to be preferable in certain cases.

Referring to Fig. 18, it will be seen that a battery 200, which may consist of dry cells, is shown with its negative terminal grounded and its positive terminal connected with one terminal of each of the field coils 20, 21. The other terminals of the coils 20, 21 are each connected to corresponding one of the leaf springs 35, 35 of the two sets of contacts 33, 34 (see also Fig. 9). The contacts 39, 39 are connected to ground. It will be recalled that each of the leaf springs 35, 35 has a wear-resistant shoe 37 which carries a contact 38 adapted to engage and disengage the corresponding contact 39. A resistance 201 and a condenser 202, connected in series and shunted across the contacts 38—39, are provided for preventing undesired arcing.

The design and connections are such that one of the coils 20, 21 sets up a field exerting a torque on the rotor or rotors during one-half revolution, and the other of the coils 20, 21 sets up a field exerting a torque on the rotor or rotors in the same direction during the other half revolution. Thus (see Fig. 17) one of the coils 20, 21 is energized when the N pole of the rotor 23 occupies positions in the arc X and the other coil is energized when the N pole of the rotor 23 occupies positions in the arc Y. This causes torque to be exerted upon the rotor during substantially each entire revolution when the load is a maximum, i. e., the torque demand greatest, to maintain the desired predetermined constant speed. When the load is lighter, or the torque demand less, each of the coils 20, 21 will be energized during a lesser portion of the arcs X, Y.

The lamp 205, connected in series with the contacts 100—105 across the battery 200, will be flashed in accordance with the predetermined code.

Figures 19, 20, 21:
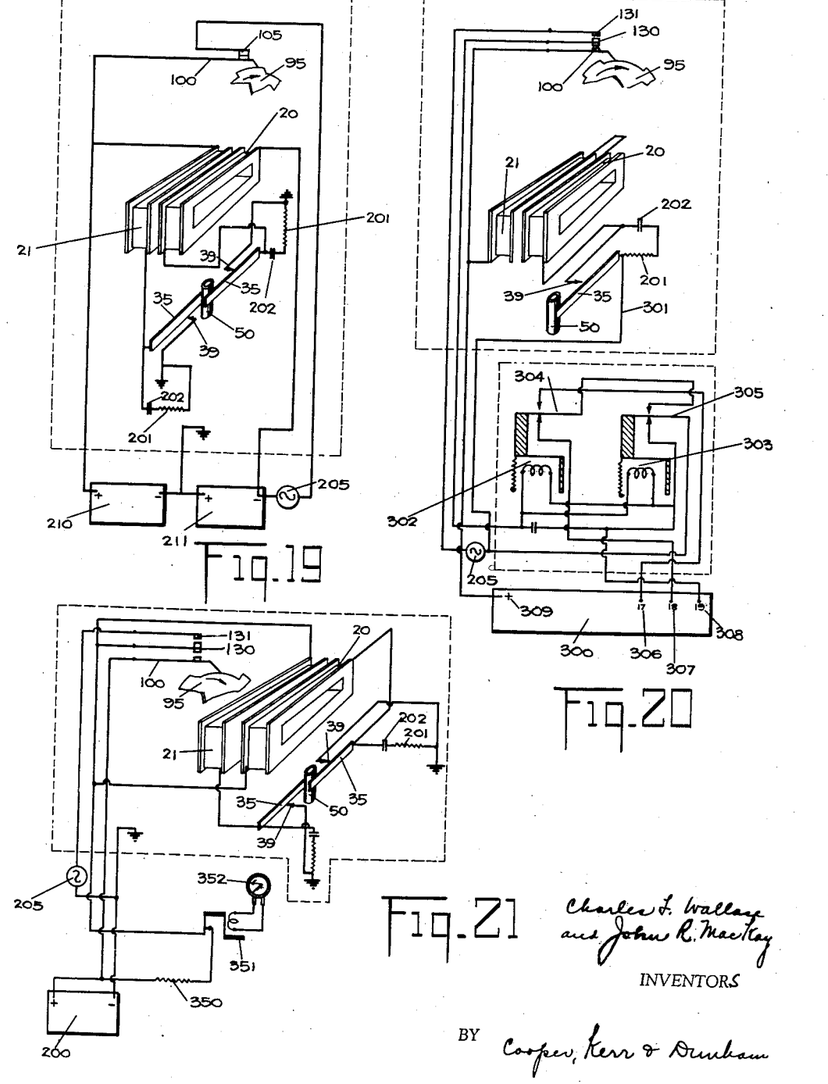

In Fig. 19, a modified form of electrical connections is shown. Here two batteries 210, 211 are provided and connected in series with the lamp 205 and contacts 100—105, and with the junction of the batteries grounded. The positive terminal of the battery 210 is connected in series with the field coil 21 and one set of contacts 35—39 to ground and the negative terminal of the battery 211 is connected in series with the other field coil (20) and the other set of contacts 35—39 to ground. Except that separate batteries are employed, the construction and operation of the apparatus when connected as in Fig. 19 is not essentially different than when connected as in Fig. 18, and will be understood in view of the foregoing disclosures.

In Fig. 20 we have shown a combination in which voltage, for example, that across the lamp 205, is automatically regulated. The electrical connections of the field windings 20, 21 and contacts 35, 39 are in general the same as those shown for the field coils 10, 10 and contacts 20, 21 in Fig. 6 of the cited Patent No. 1,985,357 and need not be described in detail. It will suffice to point out that the energizing circuit for the motors is as follows: from the positive side of the battery 300, through the coils 21, 20 in series, through the contacts 35, 39 to the conductor 301, and thence to one or another of negative taps of the battery through connections hereinafter described. In certain, indeed many, cases it is preferable to use the two sets of contacts 35—39 and to connect the coils 20, 21 as shown in Fig. 18. In that event, one terminal of each coil 20, 21 would be connected to the positive terminal of the battery 300, and the other end of each coil connected through its corresponding pair of contacts 35—39 to the conductor 301.

Assume, as is often the case in practice, that the battery 300 is one whose terminal voltage will vary with temperature, age, rate of discharge, etc. The life of the incandescent lamp 205 depends upon the voltage impressed upon it; the life being shortened by excess voltage. It is desirable that the battery 300 be employed until it has spent substantially all of its useful energy and also that the useful life of the lamp 205 be as long as possible. It is with these things in mind that we have provided a voltage regulating means comprising relays and connections now to be described.

Except in a respect presently to be noted, the relays 302, 303 are alike. They are of the voltage sensitive type and consume little current. Each of the relays comprises an armature which is spring biased away from its coil and adapted to operate a switch or contact arm 304, 305 having front and back contacts as shown. The battery 300 is shown as having three negative taps or terminals 306, 307, 308, and it may be assumed that there are 19 cells in series between the terminals 309—308, 18 cells in series between the terminals 309—307, and 17 cells in series between the terminals 309—306. The coils of the relays 302, 303 are shown connected as follows: from the positive terminal 309 of the battery 300 to the contact 100 (see also Fig. 13), from the contact 130 through the two relay coils connected in parallel, and thence to the negative terminal 308 of the battery 300. The circuit of the lamp 205 is shown as follows: from the positive terminal 309 of the battery 300 to the contact 100, from the contact 131 to the lamp 205, and from the lamp 205 through one or another of the following paths:

(a) Contact arm 305 and back contact of relay 303 to the battery terminal 308 (if the coil of the relay 303 is not energized sufficiently to attract its armature), or (b) Contact arm 305, front contact of relay 303, back contact of relay 302 to the battery terminal 307 (if the coil of the relay 303 is energized sufficiently to attract its armature, but the coil of the relay 302 is not energized sufficiently to attract its armature), or (c) Contact arm 305, front contact of relay 303, front contact of relay 302 to the battery terminal 306 (if the coil of each relay is energized sufficiently to attract its armature).

The contacts 100—130 are closed by the program disc 95 before the contacts 100—131 close, and the contacts 100—130 open after the contacts 100—131 open. Assume that the relay 302 is set to operate, i. e., to attract its armature and shift the arm 304 from back contact to front contact, when the voltage across its coil is 14.5 volts or more; and that the relay 303 is set to operate when the voltage across its coil is 13 volts or more. When the contacts 100—130 close the circuit of the coils of the relays 302, 303 is closed and the voltage across the terminals 309—308 is impressed across each relay coil. If this voltage exceeds 14.5 volts, the contact arms 304, 305 disengage their back contacts and engage their front contacts 30 that when the contact 131 is thereafter engaged by the contact 130, the lamp 205 is energized in the following circuit: from the positive terminal 309 of the battery 300 through the contacts 100—130—131, through the lamp 205, through the arm 305 and front contact of the relay 303, through the arm 304 and front contact of the relay 302, to the low voltage terminal 306 of the battery 300. If, at the time of closure of the contacts 100—130, the voltage across the battery terminals 309—308 is more than 13 volts but less than 14.5 volts, only the coil of the relay 303 will be energized sufficiently to cause its contact arm to disengage its back contact and to engage its front contact, thereby causing the lamp 205 to be energized, upon subsequent closure of the contact 131, in the following circuit: from the positive terminal 309 of the battery 300 through the contacts 100—130—131, through the lamp 205, through the arm 305 and front contact of the relay 303, through the arm 304 and back contact of the relay 302, to the intermediate voltage terminal 307 of the battery 300. If, at the time of closure of the contacts 100—130, the voltage across the battery terminals 309—308 is less than 13 volts, neither of the coils of the relays 302, 303 will be energized sufficiently to cause its contact arm to disengage its back contact and to engage its front contact, so that upon subsequent closure of the contact 131, the lamp 205 will be energized in the following circuit: from the positive terminal of the battery 300, through the contacts 100—130—131, through the lamp 205, through the arm 305 and back the contact of the relay 303, to the full voltage terminal 308 of the battery 300. In this way the voltage across the lamp is automatically regulated, the useful life of the lamp prolonged, and other marked advantages gained.

In Fig. 21 we have diagrammatically shown a combination of mechanism whereby the life of the lamp and battery are materially prolonged. The motor-energizing circuit is essentially the same as that shown in Fig. 18 and described above, except that there are interposed in series in the positive lead from the battery 200 to the motor, a limiting resistance 350 and the back contacts of a sensitive relay 351. The coil of the relay 351 is connected to a light-sensitive cell 352, for example, a Weston photronic cell, so that whenever there is sufficient light to render the use of the flashing lamp unnecessary, the coil of the relay 351 will be energized sufficiently to maintain its back contacts open. When, however, the visibility is so low as to render the use of the lamp 205 necessary, or desirable, the energization of the coil of the relay 351 becomes insufficient to maintain the back contacts thereof open, the back contacts close and the motor thus automatically begins to operate and to continue to operate until the back contacts of the relay 351 are again opened by re-energization of the relay coil in response to the return of sufficient visibility.

When the motor is operating, the program disc 95 operates its contacts so as to flash the lamp 205 in accordance with the predetermined program. The circuit of the lamp 205 is as follows: from the positive terminal of the battery 200 through the contacts 100—130—131, through the lamp 205, to the negative terminal of the battery 200.

In order to insure that the motor will not stop (by the opening of the back contacts of the relay 351) in a position wherein a high spot of the program disc 95 closes the contacts 130—131, which would keep the lamp 205 energized, we provide, around the said back contacts, a shunt connection containing the contacts 100—130. Assume now that the contacts of the relay 351 have opened, by a restoration of sufficient visibility, and that the motor, when coasting to rest, stops or tends to stop in such position that a high spot of the program disc 95 is adjacent the contacts 130—131 and is holding them closed. Notwithstanding that the contacts of the relay 351 are now open, the motor is energized in the following circuit: from the positive terminal of the battery 200, through the contacts 100—130, through one or the other of the field coils 20, 21 and its corresponding contacts 35—39 to ground and thence to the negative terminal of the battery 200. This circuit, last traced, maintains the motor circuit closed until the contacts 100—130—131 open, whereupon the motor stops and the lamp circuit is opened. The resistance of the element 350 is comparatively high; not so high as to interfere with the proper operation of the motor but high enough to prevent passage therethrough of sufficient current to light the lamp or injure the delicate contacts of the relay.

In view of the disclosures in the cited Patent No. 1,985,357 and herein, it will be appreciated that the apparatus and combinations herein disclosed possess not only features of invention disclosed and claimed in the said patent but also features of improvement which are decidedly useful and advantageous and some of which will now be summarized.

By employing the members 30, 31 of Fig. 15, or the member 32 of Figs. 14 and 16, in combination with the rotor 23, there is provided a magnetic circuit which increases the efficiency and power output of the motor and which localizes the magnetic flux so as to reduce eddy current losses due to surrounding metal containers or adjacent metal objects. The casing 141 may therefore, without loss of motor efficiency, be made of mechanically strong and heavy metal instead of comparatively fragile insulating material.

Novel combinations of contacts and electrical connections are provided whereby a plurality of power impulses per revolution of the motor rotor are obtained, thereby increasing desired torque and increasing power output and efficiency. By providing a plurality of sets of motor contacts and associated connections (Figs. 9, 18, etc.) the motor will continue to operate even though one set of contacts is disabled by foreign matter or otherwise. Furthermore, when the motor circuit is closed to start the motor it is comparatively unlikely that the rotor will have previously stopped in such position that neither set of contacts will be closed (see Fig. 17) even though the biasing torque produced by the stationary permanent magnet has been insufficient to have caused the rotor 23 to assume a position parallel with the said stationary permanent magnet. The likelihood of the motor stopping, when deenergized, in a position from which it will not automatically start when re-energized, is therefore rendered comparatively remote.

The motor control contacts (see Figs. 5 and 9) are readily accessible for inspection, cleaning and accurate adjustment, by swinging them out to their freely accessible position and, upon release after such inspection, cleaning, or adjustment, they automatically return to proper position with respect to the control sleeve 50.

Features of improvement with respect to the motor-controlled contacts (Figs. 6 and 10 to 14) are that they may be readily accurately, and minutely, adjusted to give the desired exact timing of closure, and securely held in such adjusted position.

The combination shown in Fig. 20 provides an efficient voltage regulator and automatic flashing device in conjunction with the motor.

The arrangement illustrated in Fig. 21 combines the motor with a flasher and sun-operated relay.

Access may be had to the program apparatus outside the casing 135—136—28 by removing the cup-shaped outer casing member 141. The program apparatus may thus not only be readily adjusted and its contacts cleaned, but the remainder and comparatively delicate parts within the transparent housing 136 are protected against dust and the elements etc. Yet, by unscrewing the screws 137, access may be readily had to the apparatus within the casing member 136 by removing the latter. The posts 43, 51 are preferably made integral with the base casting 28 whereby the motor parts are permanently maintained in their desired relationships.

The electrical connections shown in Fig. 19 offer the following advantage, among others, as compared to those shown in Fig. 18. If, as may sometimes be the case, the lamp 205 (Fig. 19) is energized from a source other than the batteries 210, 211, the provision of the plurality of batteries 210, 211, connected as shown, will permit continued operation of the motor even though one of the batteries 210, 211 has failed due to local action or otherwise.

As stated with respect to Fig. 20, the relay-control contacts 100—130 are closed before the lamp-control contacts 100—131 close, and the relay-control contacts 100—130 open after the lamp-control contacts 100—131 open. Any operation of the armatures and contacts of either or both relays 302, 303, upon closure of the contacts 100—130, is completed before the contacts 100—131 close; and any operation of the armatures and contacts of either or both relays 302, 303, by opening of the contacts 100—130, occurs after the contacts 100—131 have opened. In short, there is no current flowing through the relay-operated contacts when either or both contact arms 304, 305 is making or breaking contact with its front and back contacts. All arcing at the relay-operated contacts is thereby prevented and the life of the relays is thereby greatly prolonged.

In accordance with the provisions of the patent statutes, we have herein described the principle of operation of our invention, together with the apparatus which we now consider to represent the most advantageous embodiments thereof, but we desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use within the scope of the appended claims.

What we claim is:

1. An electric motor comprising in combination, a field winding comprising an air core solenoid, a permanently magnetized rotor mounted for rotation within said solenoid about an axis at an angle to the axis of the solenoid, flux-localizing means comprising a bar of ferrous metal adjacent to and rotatable with said rotor and providing therefor a magnetic path of substantially less reluctance than air, and means controlled by rotation of said rotor for energizing and deenergizing said field winding to produce a torque upon and rotate said rotor.

2. An electric motor comprising in combination, a field winding comprising a solenoid, a permanently magnetized rotor mounted for rotation within said solenoid about an axis at an angle to the axis of the solenoid, a second permanent magnet rotatable with said rotor and astatically arranged with respect to said rotor exteriorly of said solenoid, and means controlled by rotation of said rotor for energizing and deenergizing said field winding to produce a torque upon and rotate said rotor.

3. An electric motor comprising in combination, a field winding comprising a solenoid, an astatic pair of rotatably mounted permanent magnets, one of said magnets being mounted for rotation within said solenoid and the other for rotation wholly outside of said solenoid, and means controlled by rotation of said magnets for energizing and deenergizing said field winding to produce a torque upon and rotate said magnets.

4. An electric motor comprising in combination, a field winding comprising a solenoid, a rotor shaft and a rotor mounted thereon for rotation within said solenoid about an axis at an angle to the axis of the solenoid, means controlled by rotation of said rotor for energizing and deenergizing said field winding to produce a torque upon and rotate said rotor, said last mentioned means comprising a contact-operating member adjacent said rotor shaft, contacts operable by said member, and means whereby said contacts may be bodily moved from motor-control position to a position facilitating inspection and cleaning.

5. An electric motor comprising in combination, a field winding comprising a solenoid, a rotor shaft and a rotor mounted thereon for rotation within said solenoid about an axis at an angle to the axis of the solenoid, means controlled by rotation of said rotor for energizing and deenergizing said field winding to produce a torque upon and rotate said rotor, said last mentioned means comprising a contact-operating member adjacent said rotor shaft, contacts operable by said member, means whereby said contacts may be bodily swung from motor-control position to a position facilitating inspection and cleaning, and means for automatically bodily restoring said contacts to motor-control position when released.

6. An electric motor comprising in combination, a plurality of air-core field windings, a permanently magnetized rotor mounted for rotation within said solenoid, and means controlled by rotation of said rotor for successively energizing said field windings one at a time to produce a torque upon and rotate said rotor.

7. An electric motor comprising in combination an astatic system of rotatably mounted permanent magnets, means for magnetically biasing said rotatable magnets toward a predetermined angular position, successively energized field windings for rotating said rotatable magnets, and means controlled by rotation of said rotatable magnets for successively energizing said field windings.

8. In combination, a motor of the magnetic type comprising a switch operated by the motor for controlling its periodic energization, means including a governor operated by the motor for maintaining its speed substantially uniform, a housing including a transparent cylinder surrounding said motor, said switch and said means, and permitting inspection of enclosed parts without removal of said cylinder, means whereby said transparent cylinder may be removed to provide access to the enclosed parts, a second housing for protecting said transparent cylinder, and means whereby said second housing may be removed to permit inspection of said motor while maintaining said first mentioned housing in protective position with respect to its enclosed parts.

9. In an electromagnetic translating device which has a field winding comprising a solenoid, in combination, a magnetizable armature mounted for movement within said solenoid about an axis at an angle to the axis of the solenoid, flux-localizing means comprising a member of high magnetic permeability disposed exteriorly of said solenoid and adjacent said armature, and providing for the armature a magnetic path of substantially less reluctance than air, and means controlled by movement of said armature for energizing and deenergizing said field winding to produce a torque upon and move said armature.

10. In an electromagnetic translating device which has a field winding comprising a solenoid, in combination, a mangetizable armature mounted for movement within said solenoid about an axis at an angle to the axis of the solenoid, flux-localizing means adjacent to said armature and providing for the armature a magnetic path having a reluctance which is substantially less than that of air and is uniform for all positions of the armature, and means controlled by movement of said armature for energizing and deenergizing said field winding to produce a torque upon and move said armature.

11. In an electric motor which has a field winding comprising a solenoid, in combination, a normally magnetized rotor mounted for rotation within said solenoid about an axis at an angle to the axis of the solenoid, flux-localizing means comprising a member of high magnetic permeability disposed adjacent to said rotor, said flux-localizing means and rotor constituting a magnetic path of uniform reluctance, substantially less than that of air, for all positions of the rotor, and means controlled by rotation of the rotor for energizing and deenergizing said field winding to produce a torque upon and rotate said rotor.

12. An electric motor comprising in combination a field winding comprising a solenoid, a rotatably mounted astatic system of permanent magnets mounted in the magnetic field produced by said solenoid to be rotated thereby, and means controlled by rotation of said system of permanent magnets for energizing and deenergizing said field winding to produce a torque upon and rotate said system of permanent magnets, said magnets being disposed with respectively opposite poles adjacent and being spaced longitudinally of their axis of rotation for traversal of torque-producing flux of the solenoid in the same direction in both magnets relative to the poles thereof.

13. An electric motor comprising in combination, a rotor comprising an astatic pair of rotatably mounted permanent magnets, a stator comprising alternately energized field windings for rotating said pair of permanent magnets, and means controlled by rotation of said permanent magnets for alternately energizing said field windings, said magnets being disposed with respectively opposite poles adjacent and being spaced longitudinally of their axis of rotation for traversal of torque-producing flux of each field winding in the same direction in both magnets relative to the poles thereof.

14. An electric motor comprising in combination, a rotor comprising an astatic system of rotatably mounted permanent magnets, means including a stationary permanent magnet for biasing said rotatable magnets toward a predetermined angular position, a stator comprising successively energized field windings for rotating said rotatable magnets, and means controlled by rotation of said rotatable magnets for successively energizing said field windings, said magnets being disposed with respectively opposite poles adjacent and being spaced longitudinally of their axis of rotation for traversal of torque-producing flux of each winding in the same direction in both magnets relative to the poles thereof.

CHARLES F. WALLACE.
JOHN R. MacKAY.